(12) United States Patent
Nakahara et al.

(10) Patent No.: US 7,843,972 B2
(45) Date of Patent: *Nov. 30, 2010

(54) OFDM SIGNAL TRANSMISSION METHOD, AND OFDM SIGNAL TRANSMITTER/RECEIVER

(75) Inventors: Hideki Nakahara, Takatsuki (JP);
Koichiro Tanaka, Takaraduka (JP);
Naganori Shirakata, Suita (JP);
Tomohiro Kimura, Hirakata (JP);
Yasuo Harada, Kobe (JP)

(73) Assignee: Panasonic Corporation, Osaka (JP)

( * ) Notice: Subject to any disclaimer, the term of this patent is extended or adjusted under 35 U.S.C. 154(b) by 935 days.

This patent is subject to a terminal disclaimer.

(21) Appl. No.: 11/312,344

(22) Filed: Dec. 21, 2005

(65) Prior Publication Data

US 2006/0104195 A1 May 18, 2006

Related U.S. Application Data

(62) Division of application No. 09/627,781, filed on Jul. 28, 2000, now Pat. No. 7,027,464.

(30) Foreign Application Priority Data

Jul. 30, 1999 (JP) .............................. 217918/1999
Mar. 22, 2000 (JP) .............................. 79896/2000

(51) Int. Cl.
*H04J 3/06* (2006.01)
*H04J 11/00* (2006.01)
*H04J 3/16* (2006.01)

(52) U.S. Cl. ........................ 370/503; 370/203; 370/465

(58) Field of Classification Search ......... 370/203–210, 370/510, 280, 281, 294, 295, 302, 314, 321, 370/326, 330, 343, 345, 442, 436, 478, 480, 370/498, 537, 540, 915; 375/260; 455/93, 455/118, 131, 142, 190.1, 207, 313, 314, 455/323, 20, 414.1, 432, 2
See application file for complete search history.

(56) References Cited

U.S. PATENT DOCUMENTS 5,018,134 A * 5/1991 Kokubo et al. ............... 370/289

(Continued)

FOREIGN PATENT DOCUMENTS

JP 07-273741 10/1995

(Continued)

OTHER PUBLICATIONS

Matsumoto, et al., "Design and Performance of OFDM for Broadband Wireless Access Systems," NTT Wireless Communication Systems Laboratories, IEICE vol. 98, No. 435, Nov. 1998, pp. 69-75.

(Continued)

*Primary Examiner*—Chi H. Pham
*Assistant Examiner*—Warner Wong
(74) *Attorney, Agent, or Firm*—Wenderoth, Lind & Ponack, L.L.P.

(57) ABSTRACT

In an OFDM transmission method, in order to compensate any frequency response variation time wise resulted from any distortion in a transmission path, out-of-synchronization with passage of time, frequency drift, and phase shift, and to improve a demodulation characteristic, a PS detector in a receiver receiving an OFDM signal detects a pilot symbol. A PS1 TPFR calculator calculates a frequency response of the transmission path for a first pilot symbol, while a PS2 TPFR calculator calculates a frequency response of the transmission path for a second pilot symbol. Thereafter, a compensation vector calculator calculates compensation vectors from the frequency responses of the transmission path for both the first and second pilot symbols by linear approximation. A frequency response compensator compensates the frequency response variation of subcarriers in a data symbol based on the calculated compensation vectors.

13 Claims, 15 Drawing Sheets

U.S. PATENT DOCUMENTS

| | | | |
|---|---|---|---|
| 5,406,551 A | 4/1995 | Saito et al. | |
| 5,636,246 A * | 6/1997 | Tzannes et al. | 375/260 |
| 5,694,389 A | 12/1997 | Seki et al. | |
| 5,734,972 A * | 3/1998 | Hayashino et al. | 455/182.2 |
| 5,867,528 A * | 2/1999 | Verbueken | 375/222 |
| 5,959,967 A * | 9/1999 | Humphrey et al. | 370/208 |
| 5,987,063 A * | 11/1999 | Rinne | 375/226 |
| 5,995,483 A * | 11/1999 | Marchok et al. | 370/207 |
| 6,172,993 B1 | 1/2001 | Kim et al. | |
| 6,304,624 B1 | 10/2001 | Seki et al. | |
| 6,459,678 B1 * | 10/2002 | Herzberg | 370/203 |
| 6,487,252 B1 * | 11/2002 | Kleider et al. | 375/260 |
| 6,560,209 B1 | 5/2003 | Alamouti et al. | |
| 6,567,374 B1 * | 5/2003 | Bohnke et al. | 370/203 |
| 6,654,429 B1 * | 11/2003 | Li | 375/316 |
| 6,671,250 B1 * | 12/2003 | Schiff | 370/209 |
| 6,782,005 B1 * | 8/2004 | Matsumoto et al. | 370/468 |
| 6,807,146 B1 * | 10/2004 | McFarland | 370/208 |
| 7,016,404 B2 * | 3/2006 | Yang | 375/229 |
| 7,573,807 B1 * | 8/2009 | Riazi et al. | 370/210 |
| 2003/0058786 A1 * | 3/2003 | Sato et al. | 370/203 |
| 2003/0128660 A1 * | 7/2003 | Ito et al. | 370/210 |
| 2003/0193925 A1 * | 10/2003 | Mujtaba | 370/347 |

FOREIGN PATENT DOCUMENTS

| | | | |
|---|---|---|---|
| JP | 8-265293 | | 10/1996 |
| JP | 11-127208 | | 5/1999 |
| WO | WO 00/43114 | * | 8/1988 |
| WO | WO 99/43114 | * | 8/1988 |

OTHER PUBLICATIONS

Kaitz, et al., "TGa Preamble Improvement Proposal," IEEE, 802.11-98/369, Nov. 1998, pp. 1-7.

* cited by examiner

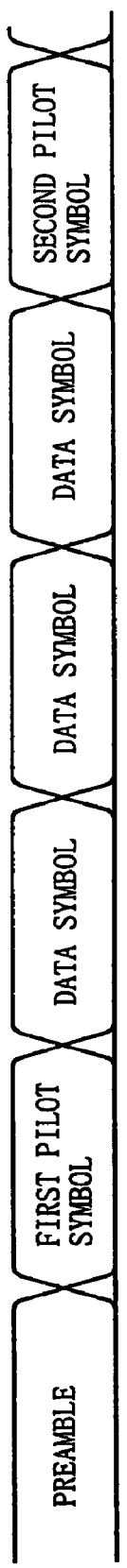
F I G. 1a
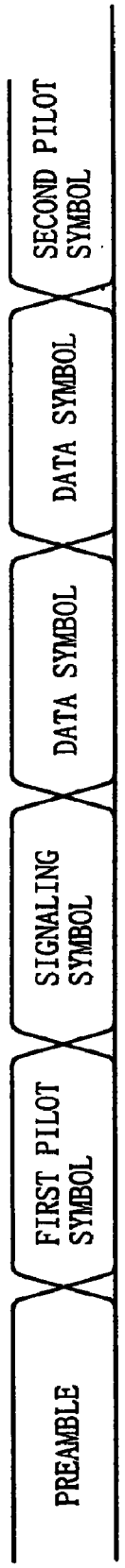
F I G. 1b
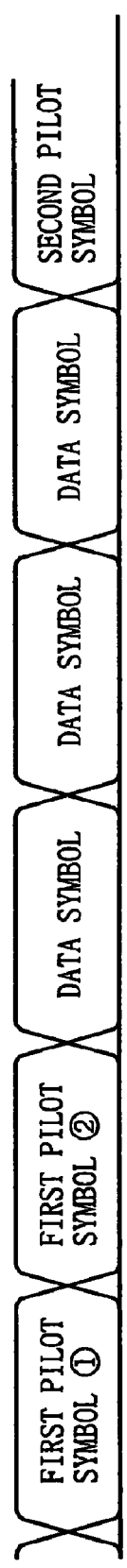
F I G. 1c
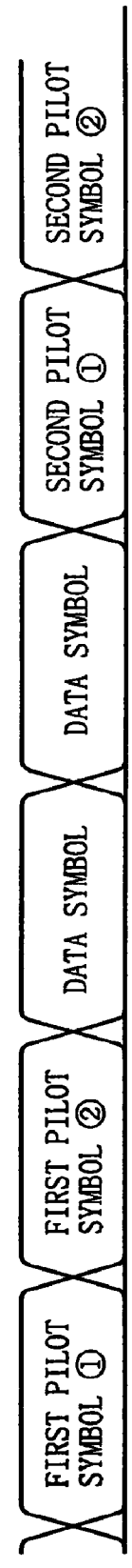
F I G. 1d

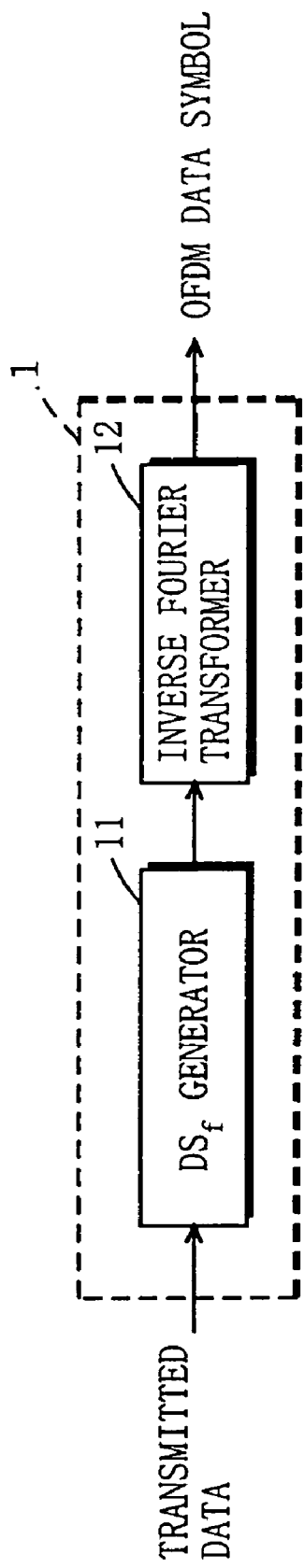
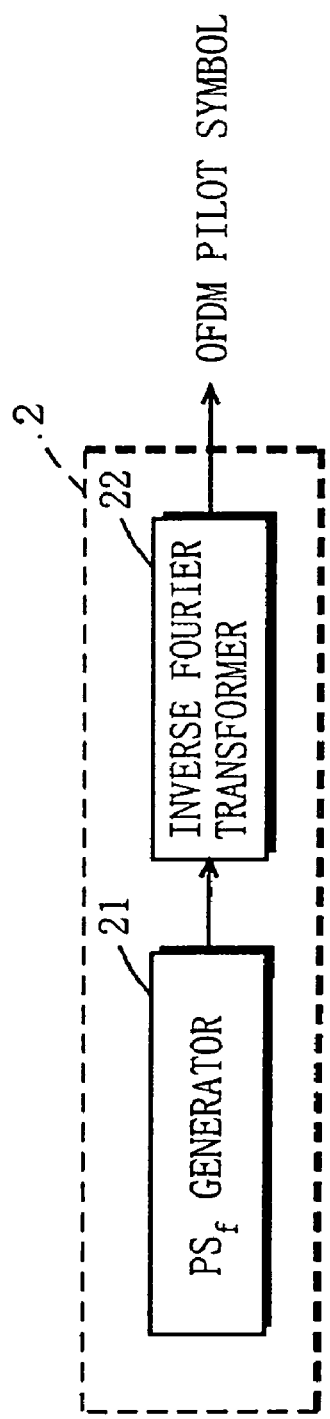

FIRST PILOT SYMBOL

REFERENCE PILOT SYMBOL

SECOND PILOT SYMBOL

REFERENCE PILOT SYMBOL

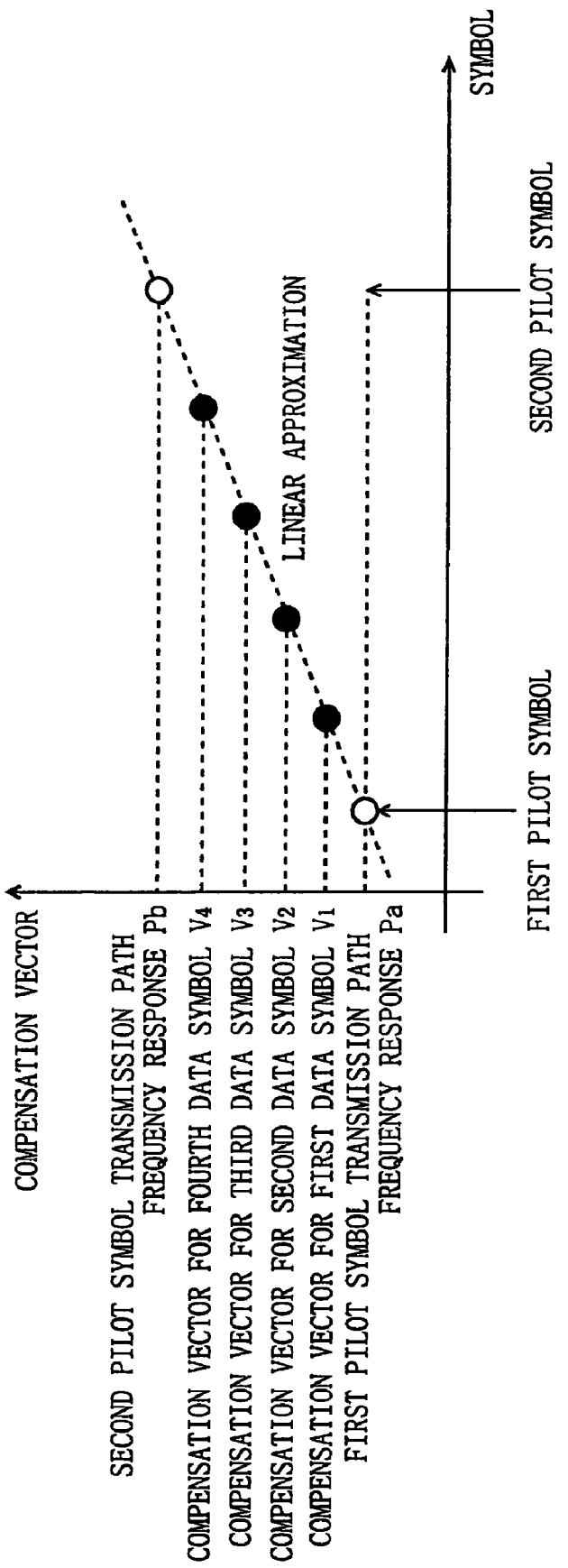

K-th DATA SYMBOL

FIRST PILOT SYMBOL

REFERENCE PILOT SYMBOL

F I G. 1 3 a
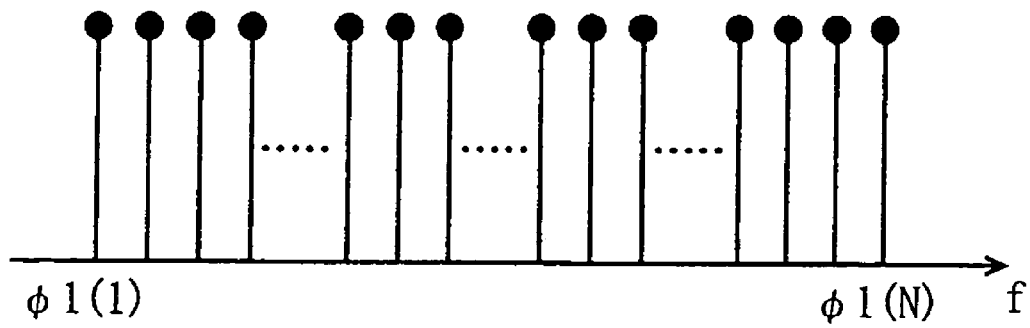
FIRST PILOT SYMBOL
F I G. 1 3 b
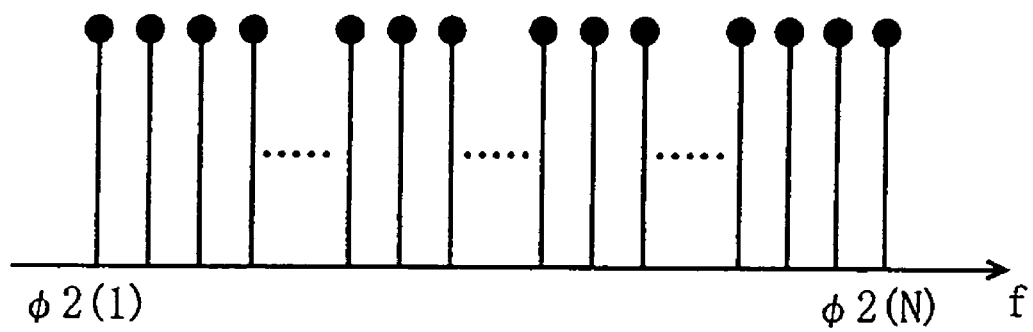
SECOND PILOT SYMBOL K-th DATA SYMBOL

OFDM SIGNAL TRANSMISSION METHOD, AND OFDM SIGNAL TRANSMITTER/RECEIVER

This application is a divisional application of Ser. No. 09/627,781, filed Jul. 28, 2000 now U.S. Pat. No. 7,027,464.

BACKGROUND OF THE INVENTION

1. Field of the Invention

The present invention relates to an OFDM (Orthogonal Frequency Division Multiplexing) transmission method, and more specifically to a scheme for transmitting data via a wired or wireless transmission path by using an OFDM signal, and a transmitter/receiver therefor.

2. Description of the Background Art

In an OFDM signal transmission scheme, a demodulation characteristic deteriorates due to any distortion observed in a transmission path, out-of-synchronization after passage of time, frequency drift between a transmission side and a reception side, amplitude and phase errors resulted from phase noise in a local oscillator provided in a receiver, and the like. Such error factors provoking the demodulation characteristic to deteriorate are hereinafter referred to as frequency response variation.

In the OFDM signal transmission scheme, for synchronization with a receiver, a transmitter often inserts one or more preambles into a signal before data transmission. The preamble is longer than one symbol time wise, and therewith, a frequency response of the transmission path can be correctly estimated. The more preambles lead to the higher accuracy in estimating the frequency response, but the transmission speed shows a considerable drop.

Therefore, as is disclosed in Japanese Patent Laying-Open No. 8-265293 (96-265293), interposing one or more pilot carriers in between data carriers in a data symbol is conventionally popular.

The OFDM signal is structured by a plurality of equal-length symbols, each of which includes several subcarriers. The above-mentioned data carrier and pilot carrier are both subcarriers. In the above prior art, a phase error of the pilot carriers included in the data symbol is detected for every data symbol for compensation.

Such prior art, however, bares a problem in an environment where any higher-level noise is observed in the transmission path or a multi-path fading environment. Accordingly, the fewer number of pilot carriers per symbol, the lower the accuracy of phase error detection becomes. Although the more number of pilot carriers surely achieve the higher accuracy thereof, the occupied frequency bandwidth becomes wider, and the transmission speed considerably drops. Furthermore, it is also difficult to compensate for the amplitude error caused by any distortion observed in the transmission path.

SUMMARY OF THE INVENTION

Therefore, an object of the present invention is to provide an OFDM signal transmission scheme (method) and a transmitter/receiver therefor. With the OFDM signal transmission scheme, even in an environment where any higher-level noise is observed in the transmission path or a multipath fading environment, any frequency response variation of the transmission path, which is caused by any one or more of distortion observed in the transmission path, out-of-synchronization after passage of time, frequency drift between transmission and reception sides, and a residual phase error, is accurately compensated for with respect to every subcarrier included in a symbol without dropping the transmission speed. Further, with such scheme, the OFDM signal is transmitted with a lower error rate.

The present invention has the following features to attain the object above.

A first aspect of the present invention is directed to a scheme for transmitting an OFDM signal from a transmission side to a reception side, wherein the OFDM signal includes both a data symbol having data therein, and a pilot symbol having a frequency component predetermined in amplitude and phase, on the transmission side, the pilot symbol is inserted before or after one or more the data symbols, and is transmitted together with one or more the data symbols, and on the reception side, the received pilot symbol is utilized for compensating for a frequency response variation of a transmission path resulted from any one or more of distortion observed in the transmission path, out-of-synchronization with passage of time, frequency drift, and residual phase error.

As described above, in the first aspect, a pilot symbol having a predetermined frequency component predetermined in amplitude and phase is inserted between data symbols with a predetermined interval on the transmission side. On the reception side, a frequency response of a transmission path is accurately estimated by using those pilot symbols. By utilizing the estimated frequency response and a difference in frequency response between any two pilot symbols away from each other for a predetermined number of data symbols, a frequency response variation of the data symbols between the pilot symbols is compensated. In this manner, the data symbols can be correctly demodulated even in the multipath fading environment or high-level-noise environment.

According to a second aspect, in the first aspect, every subcarrier included in the pilot symbol is a pilot carrier predetermined in amplitude and phase.

As described above, in the second aspect, the symbol length remains the same regardless of the number of subcarriers included therein. Accordingly, transmission speed does not drop even if one symbol wholly includes the subcarriers, and thus an OFDM signal transmission scheme in which the phase error is corrected with higher accuracy can be implemented.

According to a third aspect, in the first aspect, the pilot symbol is plurally and sequentially inserted before or after one or more of the data symbols.

As described above, in the third aspect, with the pilot symbol inserted plurally in a row, the frequency response of the transmission path can be estimated with higher accuracy on the reception side. Therefore, the data symbols can be correctly demodulated even in the multipath fading environment or high-level-noise environment.

According to a fourth aspect, in the first aspect, the pilot symbol is periodically inserted before or after one or more of the data symbols.

As described above, in the fourth aspect, with the pilot symbol periodically inserted, the temporal location of the pilot symbol can be easily detected when received.

According to a fifth aspect, in the first aspect, the pilot symbol is non-periodically inserted before or after one or more of the data symbols.

As described above, in the fifth aspect, when the pilot symbol is inserted non-periodically or with an irregular interval, the insertion interval is determined depending on how speedy the transmission path changes in state.

According to a sixth aspect, in the fifth aspect, on the transmission side, the pilot symbol is adaptively changed in frequency and number for insertion depending on a state of the transmission path.

As described above, in the sixth aspect, by adaptively changing the pilot symbol in frequency and number for insertion depending on what state the transmission path is in, the transmission efficiency can be improved.

According to a seventh aspect, in the fifth aspect, on the transmission side, the OFDM signal is provided with control information indicating how often and how many pilot symbols are inserted.

As described above, in the seventh aspect, by providing the transmission signal with the control information telling how often and how many pilot symbols are to be inserted in between the data symbols, the pilot symbol and the data symbol are discriminated from each other based on the control information at demodulation on the reception side.

According to an eighth aspect, in the first aspect, the frequency response variation of the transmission path is compensated for by using a compensation vector calculated, as a time series linear approximation, from a difference in frequency response between any two pilot symbols closest to each other.

As described above, in the eighth aspect, the frequency response variation of the data symbols between the pilot symbols is compensated for by linear approximation. In this manner, the phase shift between the pilot symbols caused by the frequency drift becomes linear with time. Therefore, compensation can be linearly done with accuracy. Further, with a proper interval of inserting the pilot symbols, the frequency response of the transmission path also becomes linear, allowing compensation to be correctly and linearly done.

According to a ninth aspect, in the first aspect, the frequency response variation of the transmission path resulted from either one or both of the frequency drift and the residual phase error is compensated for by using a value calculated, as a time series linear approximation, from a difference in phase between any two pilot symbols closest to each other.

As described above, in the ninth aspect, the phase error of the data symbols between the pilot symbols is compensated for by linear approximation. In this manner, the phase shift caused by the frequency drift becomes linear with time, and thus compensation can be linearly done with accuracy.

According to a tenth aspect, in the first aspect, the frequency response variation of the transmission path is compensated for by using an average value taken for a phase error among pilot carriers in the pilot symbol.

As described above, in the tenth aspect, by averaging the phase error of the received pilot carriers, such OFDM signal transmission scheme that the phase error is corrected with higher accuracy can be implemented.

According to an eleventh aspect, in the tenth aspect, the average value is calculated by weighing each amplitude value for the pilot carriers.

As described above, in the eleventh aspect, by calculating an average value after weighing each carrier in the received pilot symbol according to its amplitude, such OFDM transmission scheme that the phase error can be corrected with higher accuracy can be implemented even if the received signal distorts in the transmission path and by noise.

A twelfth aspect of the present invention is directed to an OFDM signal transmitter for transmitting an OFDM signal towards a reception side, comprising:

a data symbol generator for generating an OFDM data symbol after inputting data for transmission;

a pilot symbol generator for generating an OFDM pilot symbol; and a symbol selector for switching between signals provided by the data symbol generator and the pilot symbol generator so that the pilot symbol is inserted before or after one or more of the data symbols.

As described above, in the twelfth aspect, a transmitter inserts a pilot symbol having a predetermined frequency component predetermined in amplitude and phase between data symbols with a predetermined interval. On the reception side, a frequency response variation of the data symbols is accurately estimated by using those pilot symbols. In this manner, the data symbols can be correctly demodulated even in the multipath fading environment or high-level-noise environment.

According to a thirteenth aspect, in the twelfth aspect, the data symbol generator comprises:
  a frequency-domain data symbol generator for generating a frequency-domain data symbol after inputting data for transmission; and
  an inverse Fourier transformer for subjecting a signal provided by the frequency-domain data symbol generator to inverse Fourier transform, and
the pilot symbol generator comprises:
  a frequency-domain pilot symbol generator for generating a frequency-domain pilot symbol; and
  an inverse Fourier transformer for subjecting a signal provided by the frequency-domain pilot symbol generator to inverse Fourier transform.

As described above, in the thirteenth aspect, the transmitter generates a signal having a predetermined frequency component predetermined in amplitude and phase and data symbols as a frequency-domain signal, and then subjects the signal to inverse Fourier transform. In this manner, it becomes possible to generate an OFDM signal in a simplified structure, and accordingly, the data symbols can be transmitted with such simplified structure even in the multipath fading environment or the high-level-noise environment.

A fourteenth aspect of the present invention is directed to an OFDM signal receiver for receiving, from a transmission side, an OFDM signal including a data symbol having data therein, and a pilot symbol having a frequency component predetermined in amplitude and phase and being inserted before or after one or more of the data symbols, the receiver comprising:

a Fourier transformer for subjecting the received OFDM signal to Fourier transform;

a transmission path frequency response compensator for detecting the pilot symbol from a signal provided by the Fourier transformer, and with respect to the signal, compensating for a frequency response variation of a transmission path; and a demodulator for receiving the signal compensated with the frequency response variation of the transmission path, and demodulating the signal for output as demodulated data.

As described above, in the fourteenth aspect, on the transmission side, a pilot symbol having a predetermined frequency component predetermined in amplitude and phase is inserted between data symbols with a predetermined interval. On the reception side, a frequency response variation is accurately estimated by using those pilot symbols. In this manner, the data symbols can be correctly demodulated even in the multipath fading environment or high-level-noise environment.

According to a fifteenth aspect, in the fourteenth aspect, the transmission path frequency response compensator calculates a compensation vector for compensation, by referring to a frequency response of a pilot symbol, a frequency response of another pilot symbol closest thereto, and a frequency response of a reference pilot symbol provided on a reception side, so that a frequency response of the received data symbol corresponds to that of the reference pilot symbol.

As described above, in the fifteenth aspect, on the transmission side, a pilot symbol having a predetermined frequency component predetermined in amplitude and phase is inserted between data symbols with a predetermined interval. On the reception side, a frequency response variation of the transmission path is accurately estimated by using those pilot symbols. The estimated frequency response is compared with a difference in frequency response between any two pilot symbols away from each other for a predetermined number of data symbols. By referring to the difference, a frequency response variation of the data symbols interposed between the pilot symbols is compensated, allowing the data symbols to be demodulated correctly even in the multipath fading environment or the high-level-noise environment.

According to a sixteenth aspect, in the fifteenth aspect, the compensation vector is calculated for every subcarrier included in the received data symbol by using every pilot carrier included in each of the pilot symbols.

As described above, in the sixteenth aspect, the compensation vector is calculated for each of the subcarriers. Therefore, even if the receiver is used for a case where distortion level of the transmission path varies or out-of-synchronization is observed with time, for example, in mobile communications, the frequency response variation is compensated for and the data symbols can be correctly demodulated.

According to a seventeenth aspect, in the fifteenth aspect, the compensation vector is calculated as a time series linear approximation from the frequency response variation between any two pilot symbols closest to each other.

As described above, in the seventeenth aspect, the frequency response variation of the data symbols between the pilot symbols is compensated for by linear approximation. In this manner, when the transmission path seems to linearly change in state between the pilot symbols, compensation can be linearly and correctly done. Further, the phase shift caused by the frequency drift is linear with time, allowing linear compensation with accuracy.

According to an eighteenth aspect, in the fourteenth aspect, the transmission path frequency response compensator comprises:

a pilot symbol detector for detecting both a first pilot symbol being an arbitrary pilot symbol and a second pilot symbol transmitted after the first pilot symbol;

a first pilot symbol transmission path frequency response calculator for calculating a first pilot symbol transmission path frequency response by dividing a frequency response of the first pilot symbol by that of a reference pilot symbol provided on a reception side;

a second pilot symbol transmission path frequency response calculator for calculating a second pilot symbol transmission path frequency response by dividing a frequency response of the second pilot symbol by that of the reference pilot symbol;

a compensation vector calculator for calculating, after inputting the first and second pilot symbol transmission path frequency responses, a compensation vector for compensating for the frequency response variation of the transmission path; and a frequency response compensator for compensating for the frequency response of one or more the data symbols after inputting the compensation vector.

As described above, in the eighteenth aspect, on the transmission side, a pilot symbol having a predetermined frequency component predetermined in amplitude and phase is inserted between data symbols with a predetermined interval. On the reception side, the first and second pilot symbol transmission path frequency response are each calculated by dividing the first and second pilot symbols detected from the received signal by a predetermined reference pilot symbol, respectively. A difference therebetween is then obtained. By using the difference, the compensation vector for the data symbols is each calculated. Therefore, in this manner, any distortion observed in the transmission path, out-of-synchronization after passage of time, frequency drift, and residual phase error for the data symbols can be correctly compensated.

A nineteenth aspect of the present invention is directed to an OFDM signal receiver for receiving, from a transmission side, an OFDM signal including a data symbol having data therein, and a pilot symbol having a frequency component predetermined in amplitude and phase and being inserted before or after one or more of the data symbols, the receiver comprising:

a Fourier transformer for subjecting the received OFDM signal to Fourier transform;

a phase compensator for detecting the pilot symbol from a signal provided by the Fourier transformer, and compensating for the signal for either one or both of frequency drift and residual phase error; and a demodulator for receiving the signal compensated with either or both of the frequency drift and the residual phase error, and demodulating the signal output demodulated data.

As described above, in the nineteenth aspect, on the transmission side, a pilot symbol having a predetermined frequency component predetermined in amplitude and phase is inserted between data symbols with a predetermined interval. On the reception side, a frequency response variation of the data symbols is accurately estimated by using those pilot symbols. In this manner, the data symbols can be correctly demodulated even in the multipath fading environment or high-level-noise environment.

According to a twentieth aspect, in the nineteenth aspect, the phase compensator calculates a compensation value for compensation, by referring to a first difference between a phase of a pilot symbol and a predetermined phase, and a second difference in phase between any two pilot symbols closest to each other, so that a phase of the received data symbol corresponds to the predetermined phase.

As described above, in the twentieth aspect, a pilot symbol having a predetermined frequency component predetermined in amplitude and phase is inserted between data symbols with a predetermined interval on the transmission side. On the reception side, a frequency response of a transmission path is accurately estimated by using those pilot symbols. By utilizing the estimated frequency response and a difference in frequency response between any two pilot symbols away from each other for a predetermined number of data symbols, a frequency response variation of the data symbols between the pilot symbols is compensated. In this manner, the data symbols can be correctly demodulated even in the multipath fading environment or high-level-noise environment.

According to a twenty-first aspect, in the twentieth aspect, the first and second differences are each calculated by using a phase average value calculated for every pilot carrier included in each of the pilot symbols.

As described above, in the twenty-first aspect, such OFDM transmission scheme that the phase error can be corrected with higher accuracy can be implemented by averaging the phase of the received pilot carriers.

According to a twenty-second aspect, in the twenty-first aspect, the phase average value is calculated by weighing each amplitude value for the pilot carriers.

As described above, in the twenty-second aspect, by calculating an average value after weighing each carrier in the received pilot symbol according to its amplitude, such OFDM transmission scheme that the average value can be calculated with higher accuracy can be implemented even if the received signal distorts in the transmission path and by noise.

According to a twenty-third aspect, in the twentieth aspect, the phase compensation value is calculated as a time series linear approximation from a difference in phase between any two pilot symbols closest to each other.

As described above, in the twenty-third aspect, the phase error of the data symbols between the pilot symbols is compensated for by linear approximation. In this manner, the phase shift caused by the frequency drift becomes linear with time, and thus compensation can be linearly done with accuracy.

According to a twenty-fourth aspect, in the nineteenth aspect, the phase compensator comprises:

a pilot symbol detector for detecting both a first pilot symbol being an arbitrary pilot symbol and a second pilot symbol transmitted after the first pilot symbol;

a first pilot symbol phase difference calculator for calculating a difference between a phase of the first pilot symbol and a predetermined phase;

a pilot symbol phase difference calculator for calculating a difference in phase between the first pilot symbol and the second pilot symbol;

a phase compensation value calculator for calculating, after inputting the phase difference value calculated by the first pilot symbol phase difference calculator and the phase difference calculated by the pilot symbol phase difference calculator, a phase compensation value for compensating for the frequency drift and the residual phase error; and a phase rotator for rotating, in response to the phase compensation value, the phase of the one or more data symbols.

As described above, in the twenty-fourth aspect, on the transmission side, a pilot symbol having a predetermined frequency component predetermined in amplitude and phase is inserted between data symbols with a predetermined interval. On the reception side, a difference in phase between the first pilot symbol to be first detected from the received signal and a reference pilot symbol provided on the reception side is found. Then, a difference in phase between the first and second pilot symbols is found. By utilizing the difference in phase, a phase compensation value for the data symbols can be obtained, allowing the frequency drift and residual phase error of the data symbols to be correctly compensated.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1a to 1d are diagrams each showing the structure of an OFDM signal in a transmission scheme according to a first embodiment of the present invention;

FIGS. 3a and 3b are block diagrams each showing the structure of a $DS_{ofdm}$ generator and a $PS_{ofdm}$ generator, respectively, in the transmitter of the first embodiment;

FIG. 8 is a graph showing that a compensation vector can be calculated, through linear approximation, from a difference between first and second transmission path frequency responses;

FIGS. 13a and 13b are schematic views each for explaining the subcarriers in the second pilot symbol and those in the reference symbol, respectively;

DESCRIPTION OF THE PREFERRED EMBODIMENTS

First Embodiment

Figure 2:
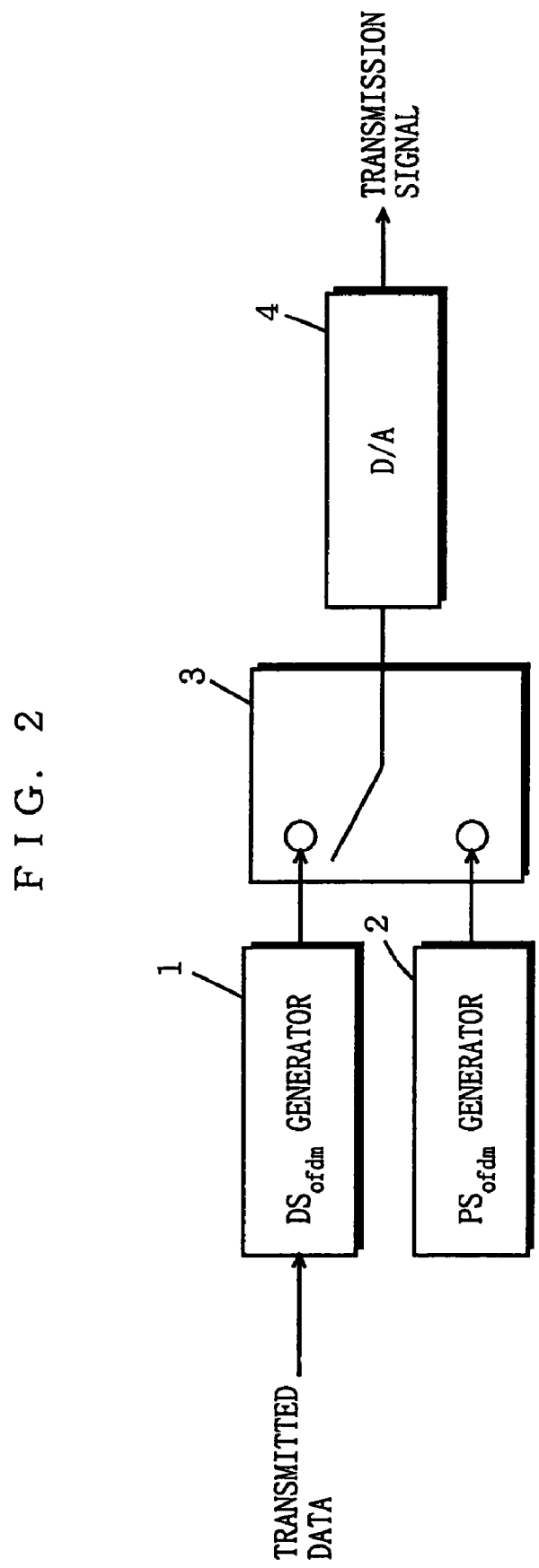
FIG. 2 is a block diagram showing the structure of a transmitter of the first embodiment.

First, described below is a transmission scheme according to a first embodiment of the present invention. FIGS. 1a to 1d are diagrams each showing the structure of an OFDM signal to be transmitted under the transmission scheme of the first embodiment. As shown in FIGS. 1a to 1d, a pilot symbol is accompanied by a plurality of data symbols. The pilot symbol has a frequency component predetermined in amplitude and phase. After the data symbols, another pilot symbol follows. As such, the OFDM signal under the transmission scheme of the first embodiment takes such structure that the pilot symbol is inserted before and after one or more data symbols. Herein, the number of pilot symbols to be inserted is not limited, but in a row if plurally provided.

The OFDM signal includes subcarriers, and the symbol length remains the same regardless of the number of subcarriers included therein. Accordingly, the subcarriers may be predetermined in amplitude and phase either wholly or partially. In order to compensate for the frequency response variation with higher accuracy, every subcarrier is preferably predetermined in amplitude and phase.

As already described above, under the OFDM signal transmission scheme, a signal to be transmitted is often provided with a preamble(s) in a transmitter for synchronization with a receiver. Such preamble is longer than one symbol time wise, and may be inserted before or during transmission with an adaptively determined interval. Although the more preambles surely lead to the higher accuracy in compensating for the frequency response variation, the transmission speed shows a considerable drop. Therefore, according to the transmission scheme of the first embodiment, the signal is preferably provided with the preamble before transmission or less often during transmission.

Further, the preamble may include control information telling how often the pilot symbol is to be inserted in between the data symbols and how many. If so, the control information is analyzed on the reception side so that the pilot symbol and the data symbol are discriminated from each other.

Still further, the control information may be inserted after an initial pilot symbol as a data symbol or a signaling symbol for transmitting information such as a cue. If so, the control information as the OFDM signal can be correctly demodulated.

As such, the OFDM signal having pilot symbols inserted before and after one or more data symbols is transmitted from the transmission side. Those pilot symbols are utilized, on the reception side, to estimate the frequency response of the transmission path with accuracy.

The estimated frequency response of the transmission path is compared with a frequency response of the transmission path between any two pilot symbols away from each other for a predetermined number of data symbols for a difference therebetween. By referring to the difference, a frequency response variation of the data symbol(s) interposed between the pilot symbols is compensated. With such transmission scheme, even in the multipath fading environment or the high-level-noise environment, the data symbols can be correctly demodulated.

Herein, as shown in FIG. 1a, the pilot symbol before the data symbol(s) is referred to as a first pilot symbol, and the one after as a second pilot symbol. The temporal interval therebetween is made longer if the transmission path does not change in state that much, but otherwise made shorter as much to make the change linearly between the pilot symbols. As such, by adaptively changing the interval of inserting the pilot symbol depending on in what state the transmission path is, the transmission efficiency is improved.

Note herein that the state of the transmission path may be measured and estimated on the transmission side, or measured on the reception side and then fed back to the transmission side for determination.

The interval of inserting the pilot symbol may be periodic or non-periodic. When the pilot symbol is periodically inserted, the temporal location thereof can be easily detected when received. In the case that the pilot symbol is inserted non-periodically or with an irregular interval, the insertion interval is determined depending on how quickly the transmission path changes in state. Herein, the expression of the pilot signal being inserted non-periodically or with an irregular interval indicates that the pilot signal is not periodically inserted for the entire duration of signal transmission. Thus, the expression does not exclude a case where the pilot symbol is periodically inserted for a short duration of signal transmission.

As a case for non-periodic insertion, as shown in FIG. 1b, the first pilot symbol is accompanied by a signaling symbol including the control information telling how often and how many pilot symbols are inserted. With such arrangement, the control information can be demodulated based on the frequency response of the transmission path estimated by using the first pilot symbol. In this manner, the demodulation is carried out more accurately than a case where the control information is included in the preamble.

Note herein that, as shown in FIG. 1c, the first pilot symbol may be doubly provided so as to improve the accuracy in estimating the frequency response of the transmission path by the pilot symbols. Further, as shown in FIG. 1d, the number of pilot symbols for one insertion may be two or plural in a row. In such case, for correct estimation, the frequency response of the transmission path is averaged for the pilot symbols.

The OFDM signal having such structure can be generated by a transmitter as described next below. FIG. 2 is a schematic view structurally showing such transmitter according to the first embodiment of the present invention. Hereinafter, presumably, the number of data symbols is M, and the number of subcarriers per symbol is N.

In FIG. 2, the transmitter includes a $DS_{ofdm}$ generator 1 for generating a data symbol from transmitted data, a $PS_{ofdm}$ generator 2 for generating a pilot symbol having such frequency component, as described above, predetermined in amplitude and phase, a symbol selector 3 for receiving two signals each from the $DS_{ofdm}$ generator 1 and the $PS_{ofdm}$ generator 2, and selecting either one of the signals for output, and a D/A converter 4 for subjecting data provided by the symbol selector 3 to D/A conversion, and outputting a transmission signal. Herein, as to the $DS_{ofdm}$ generator 1 and $PS_{ofdm}$ generator 2, "DS" denotes "Data Symbol", and "PS" "Pilot Symbol". Further, "ofdm" accompanying DS and PS denotes that the symbol is an OFDM signal.

Depicted in FIGS. 3a and 3b are block diagrams respectively showing the detailed structure of the $DS_{ofdm}$ generator 1 and the $PS_{ofdm}$ generator 2 in the transmitter of the first embodiment. In FIG. 3a, the $DS_{ofdm}$ generator 1 includes a $DS_f$ generator 11 and an inverse Fourier transformer 12. Herein, as to the $DS_f$ generator 11, "DS" denotes "Data Symbol", and "f" accompanying DS denotes that the symbol is a frequency-domain signal. In FIG. 3b, the $PS_{ofdm}$ generator 2 includes a $PS_f$ generator 21 and an inverse Fourier transformer 22. Herein, the above description for "PS" and "f" is also applicable to the $PS_f$ generator 21.

Referring back to FIG. 2, data for transmission is provided to the $DS_{ofdm}$ generator 1. The data is then converted into a data symbol, and is outputted to the symbol selector 3.

More specifically, referring to FIG. 3a, the data for transmission is first provided to the $DS_f$ generator 11. The $DS_f$ generator 11 outputs a frequency-domain data symbol, which includes many data carriers arranged on a frequency axis with a predetermined interval. This frequency-domain data symbol is subjected to inverse Fourier transform by the inverse Fourier transformer 12, and then is converted into a time-domain OFDM data symbol. After the conversion, the OFDM data symbol is provided to the symbol selector 3.

The above-described pilot symbol having the frequency component predetermined in amplitude and phase is generated in the $PS_{ofdm}$ generator 2, and is outputted to the symbol selector 3.

In detail, referring to FIG. 3b, the $PS_f$ generator 21 outputs the frequency-domain pilot symbol including many pilot carriers arranged on the frequency axis with a predetermined interval. The frequency-domain pilot symbol is subjected to inverse Fourier transform by the inverse Fourier transformer 22, and is converted into a time-domain OFDM pilot symbol. After the conversion, the OFDM pilot symbol is provided to the symbol selector 3.

The symbol selector 3 selects either one of those two signals for output. Herein, the symbol selector 3 is assumed to output such signal as shown in FIG. 1a, in which pilot symbol insertion is made for every three data symbols.

If this is the case, the symbol selector 3 first selects the PS$_{ofdm}$, generator 2 for its signal. After the pilot symbol is outputted, the symbol selector 3 then selects the DS$_{ofdm}$ generator 1 for its signal. When three data symbols are outputted, the symbol selector 2 selects the PS$_{ofdm}$ generator 2 for its signal. Thereafter, in the same manner, the symbol selector 3 selects the DS$_{ofdm}$ generator 1 for its signal when another pilot symbol is outputted. As such, by switching among the two signals, the symbol selector 3 becomes capable of successively outputting such OFDM signal as shown in FIG. 1a.

Such signal outputted from the symbol selector 3 is provided to the D/A converter 4. The D/A converter 4 subjects the signal to D/A conversion, and outputs the D/A converted signal as a transmission signal.

As is known from the above, the transmitter of the first embodiment inserts a pilot symbol having a frequency component predetermined in amplitude and phase in between data symbols with a predetermined interval. With such transmitter, as long as the frequency response variation of the data symbols is accurately compensated for on the reception side by using those pilot symbols, data symbol transmission can be correctly done even in the multipath fading environment or the high-level-noise environment.

Figure 4:
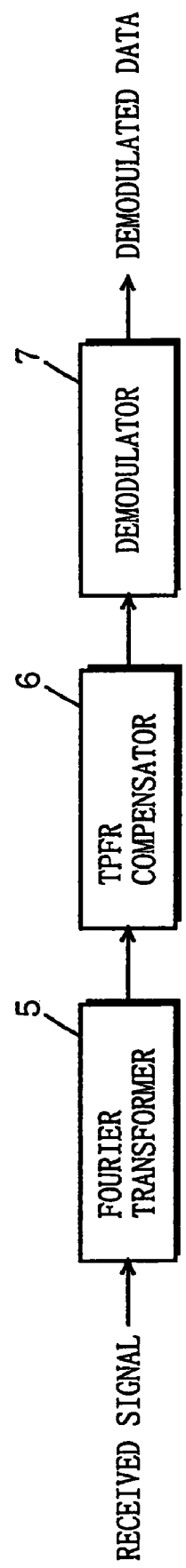
FIG. 4 is a block diagram showing the structure of a receiver of the first embodiment.

Depicted in FIG. 4 is a schematic view structurally showing a receiver according to the first embodiment of the present invention. In FIG. 4, the receiver includes a Fourier transformer 5 for subjecting a received signal to Fourier transform, a TPFR compensator 6 for compensating for a frequency response variation of a signal provided by the Fourier transformer 5, and a demodulator 7 for demodulating a signal provided by the TPFR compensator 6. Herein, as to the TPFR compensator 6, "TPFR" denotes a transmission path frequency response.

The Fourier transformer 5 subjects every symbol to Fourier transform, and then outputs frequency-domain data. The outputted data has the frequency response variation of the transmission path eliminated therefrom in the TPFR compensator 6. Thereafter, the data freed from the frequency response variation is demodulated as the data symbol in the demodulator 7.

Figure 5:
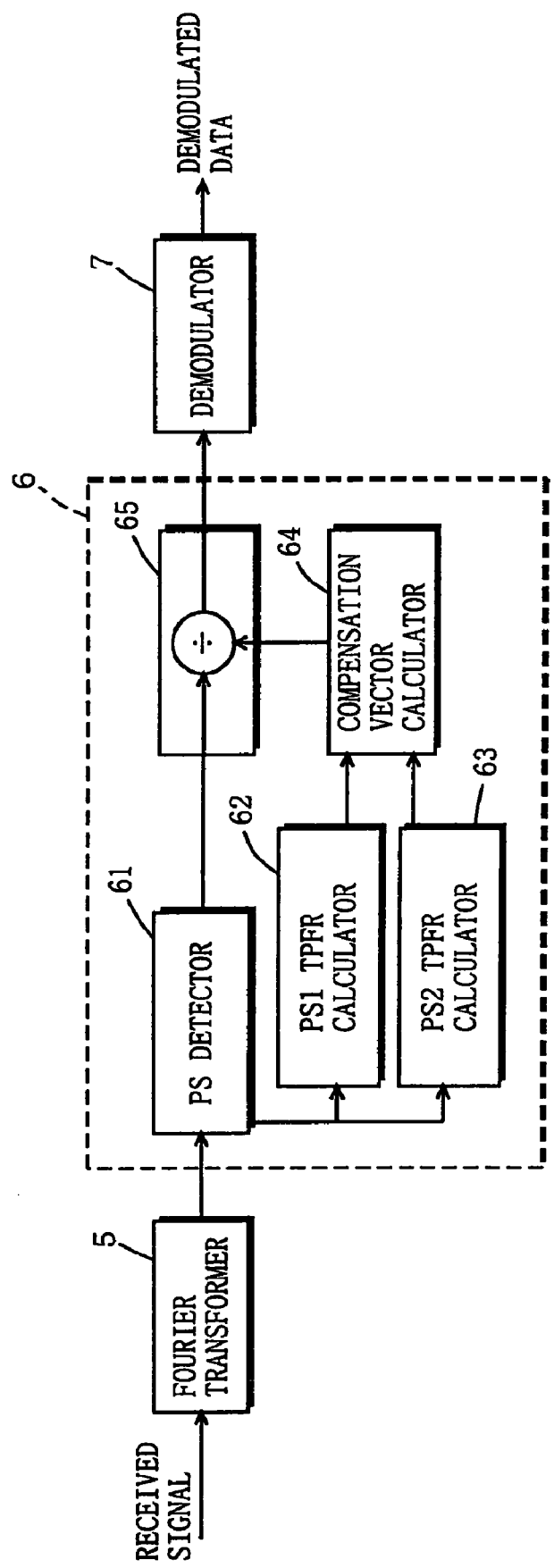
FIG. 5 is a block diagram showing the structure of a TPFR compensator 6 in the receiver of the first embodiment.

FIG. 5 is a schematic view showing the structure of the TPFR compensator 6 in the receiver of the first embodiment. In FIG. 5, the TPFR compensator 6 includes: a PS detector 61 for detecting the pilot symbol from the signal provided by the Fourier transformer 5; a PS1 TPFR calculator 62 for dividing the first pilot symbol provided by the PS detector 61 by a reference pilot symbol; a PS2 TPFR calculator 63 for dividing the second pilot symbol provided by the PS detector 61 by the reference pilot symbol; a compensation vector calculator 64 for calculating a compensation vector after receiving outputs from the PS1 and PS2 TPFR calculators 62 and 63; and a frequency response compensator 65 for compensating for a frequency response of a signal provided by the PS detector 61 on the basis of an output from the compensation vector calculator 64. Herein, for the above components, "PS1" denotes "first pilot symbol", and "PS2" "second pilot symbol".

The PS detector 61 detects the pilot symbol from the Fourier-transformed frequency-domain data. The PS1 TPFR calculator 62 divides the subcarriers in the first pilot symbol by those in the reference pilot symbol stored in memory (not shown) in the receiver, thereby estimating the frequency response of the transmission path.

The reference pilot symbol stored in the memory is considered ideal having no frequency response variation error at the time of reception. Accordingly, the frequency response of the transmission path can be accurately calculated by dividing the frequency response of the subcarriers in the first pilot symbol by those in the reference pilot symbol.

Figure 6A:
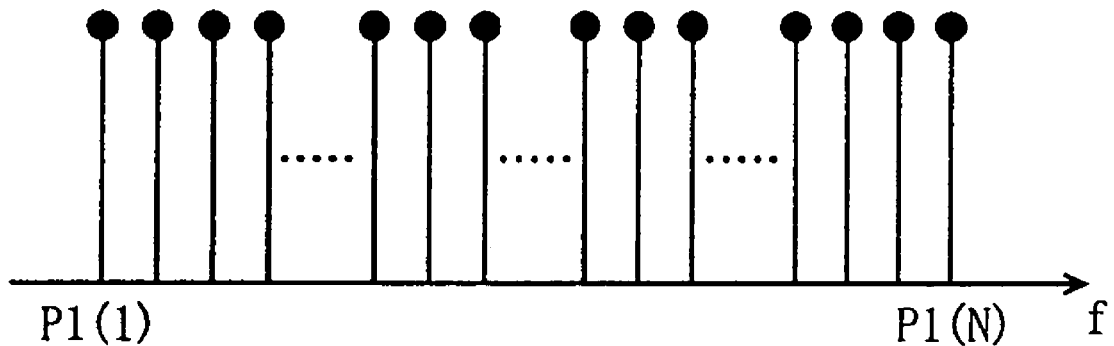
FIGS. 6a and 6b are schematic views each for explaining subcarriers of a first pilot symbol and those of a reference symbol, respectively.
Figure 6B:
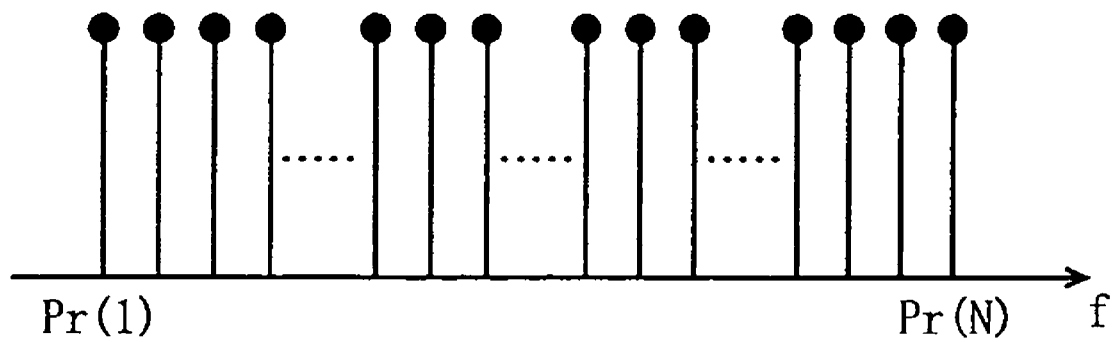

FIGS. 6a and 6b are schematic views respectively showing the first pilot symbol having subcarriers with a complex amplitude of P1, and the reference pilot symbol having those with a complex amplitude of Pr. The PS1 TPFR calculator 62 divides the complex amplitude P1 as shown in FIG. 6a by the complex amplitude Pr as shown in FIG. 6b so as to calculate a frequency response of the transmission path Pa. An equation (1) therefor is as follows:

$$Pa(i)=P1(i)\div Pr(i) \tag{1}$$

where i is an arbitrary integer between 1 and N.

As described in the foregoing, when the pilot symbol is sequentially and plurally inserted, the frequency response of the transmission path is averaged for the pilot symbols. In this manner, the frequency response of the transmission path for the pilot symbols can be estimated with higher accuracy.

With reference to FIG. 5 again, the PS2 TPFR calculator 63 divides the subcarriers in the second pilot symbol by those in the reference pilot symbol exemplarily stored in the memory in the receiver, thereby estimating the frequency response of the transmission path for the second pilot symbol.

Figure 7A:
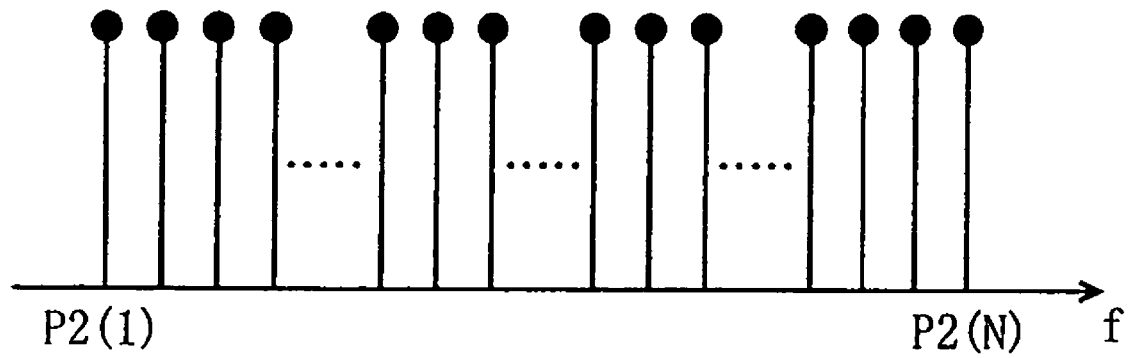
FIGS. 7a and 7b are schematic views each for explaining subcarriers of a second pilot symbol and those of the reference symbol, respectively.
Figure 7B:
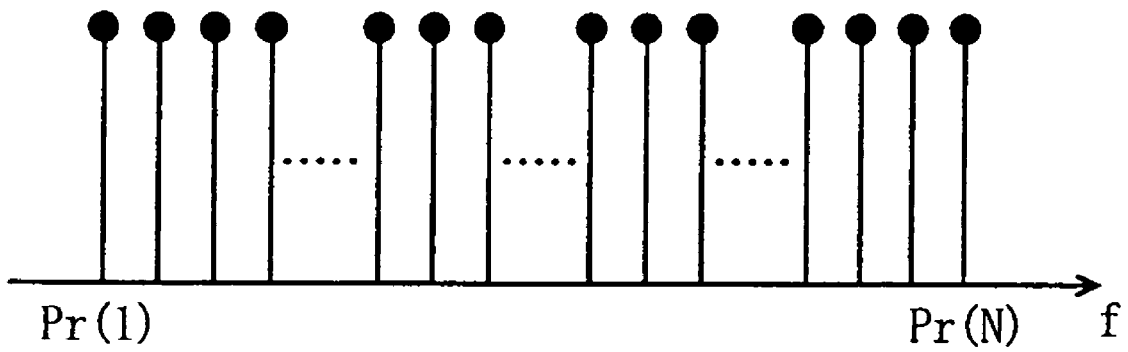

FIGS. 7a and 7b are schematic views respectively showing the second pilot symbol having the subcarriers with a complex amplitude of P2 and the reference pilot symbol having those with the complex amplitude of Pr. The PS2 TPFR calculator 63 divides the complex amplitude P2 as shown in FIG. 7a by the complex amplitude Pr as shown in FIG. 7b so as to calculate a frequency response of the transmission path Pb. An equation (2) therefor is as follows:

$$Pb(i)=P2(i)\div Pr(i) \tag{2}$$

where i is an arbitrary integer between 1 and N.

As already described in the foregoing, when the second pilot symbol is sequentially and plurally inserted, the frequency response of the transmission path is averaged for the pilot symbols. In this manner, the frequency response of the transmission path for the second pilot symbols can be estimated with higher accuracy.

The compensation vector calculator 64 calculates a compensation vector Vk for each of the data symbols between the first and second pilot symbols. This is done by linear approximation between the first and second pilot symbol transmission path frequency responses Pa and Pb. The linear approximation is applicable herein since the pilot symbols are inserted with a shorter interval to make the transmission path linearly change in state, and the phase shift caused by frequency drift becomes linear with time. Therefore, by utilizing linear approximation, compensation can be linearly done with accuracy.

FIG. 8 is a graph having a longitudinal axis indicating the compensation vector Vk for each of the data symbols between the first and the second pilot symbols and a lateral axis indicating the symbols by number, i.e., time, and the graph shows the relationship therebetween. As is known from FIG. 8, the compensation vector Vk for each of the data symbols can be calculated, through linear approximation, from a difference between the pilot symbols in frequency response of the transmission path.

It is now assumed that the number of data symbols between the first and second pilot symbols is M, and a certain data symbol therebetween is k, where k is an arbitrary integer between 1 and M. With such assumption and by using an equation (3) below, the compensation vector Vk is calculated for each of the data symbols through linear approximation.

$$Vk(i) = Pa(i) + \frac{Pb(i) - Pa(i)}{M+1} \times k \qquad (3)$$

where k is an arbitrary integer between 1 and M.

By using the compensation vectors calculated in such manner, the frequency response compensator 65 then compensates for the frequency response variation of the subcarriers included in each of the data symbols between the first and second pilot symbols.

Figure 9:
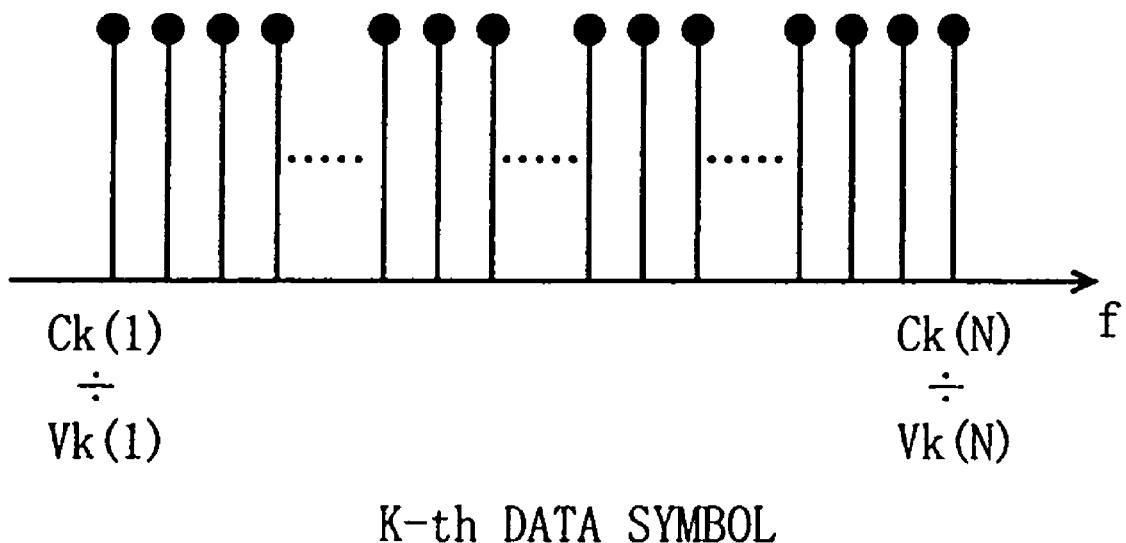
FIG. 9 is a schematic view for explaining how a frequency response variation of subcarriers in a data symbol is compensated.

FIG. 9 is a schematic view showing how the frequency response variation of the k-th data symbol is compensated. With the compensation vectors, the frequency response variation of the subcarriers in each of the data symbols is compensated for as follows with an equation (4).

$$C'k(i)=Ck(i)/Vk(i) \qquad (4)$$

Such compensation is carried out with respect to the k data symbols between the first and second pilot symbols. Therefore, practically, these data symbols are once stored in a data symbol storage (not shown) provided in the receiver, for example. After the compensation vectors are calculated, the data symbols stored in the storage are read, and then the frequency response variation is compensated for with respect to the data symbols.

Typically, such data symbol storage is provided preceding to or in the frequency response compensator 65. With respect to the data symbols stored therein, the compensation vector calculator 64 calculates the compensation vectors Vk respectively, and then the frequency response compensator 65 compensates for the frequency response variation thereof.

In this manner, however, demodulation cannot be done for the period after the first pilot symbol is received and before the second pilot symbol is received, rendering the receiver of the first embodiment to take a certain length of time for its processing. By taking this into consideration, the receiver of the first embodiment is more suitable for image transmission in which an image is not required so soon to be retransmitted or under a broadcast transmission system.

In the above-described manner, the compensation vector can be calculated to compensate for the frequency response variation resulted from the change in state of the transmission path for each of the subcarriers in the pilot symbol. Therefore, in the OFDM transmission scheme of the first embodiment, the compensation vector can be calculated with higher accuracy for every subcarrier compared with the conventional scheme for interposing the pilot carriers between the data carriers. Since the pilot carriers for insertion in the conventional scheme are quite fewer in number than the subcarriers, it is rather difficult to calculate the frequency response variation of the transmission path, with accuracy, for the entire frequency band.

As such, the frequency response compensator 65 can free the received data from the frequency response variation of the transmission path. Especially when the transmission path changes approximately linearly in state between the pilot symbols, the data symbols can be correctly demodulated even in the multipath fading environment or the high-level-noise environment. This is enabled by compensating, through linear approximation, for the frequency response of the data symbols between the pilot symbols. Further, the phase shift caused by the frequency drift is linear with time, allowing linear compensation with accuracy.

In a case where the transmission path does not change in state that much, the frequency response variation of the transmission path for the data symbols may be compensated for by using only one pilot symbol preceding thereto. Accordingly, the frequency response variation of the transmission path for the data symbols can be compensated for without receiving another pilot symbol subsequent thereto.

Second Embodiment

A transmission scheme according to a second embodiment of the present invention is quite similar to the one described in the first embodiment. Further, a transmitter of the second embodiment is structurally identical to the one in the first embodiment, and is not described twice. A receiver of the second embodiment, however, is partially different in structure from the one in the first embodiment, and thus a description is made focusing on the difference.

Figure 10:
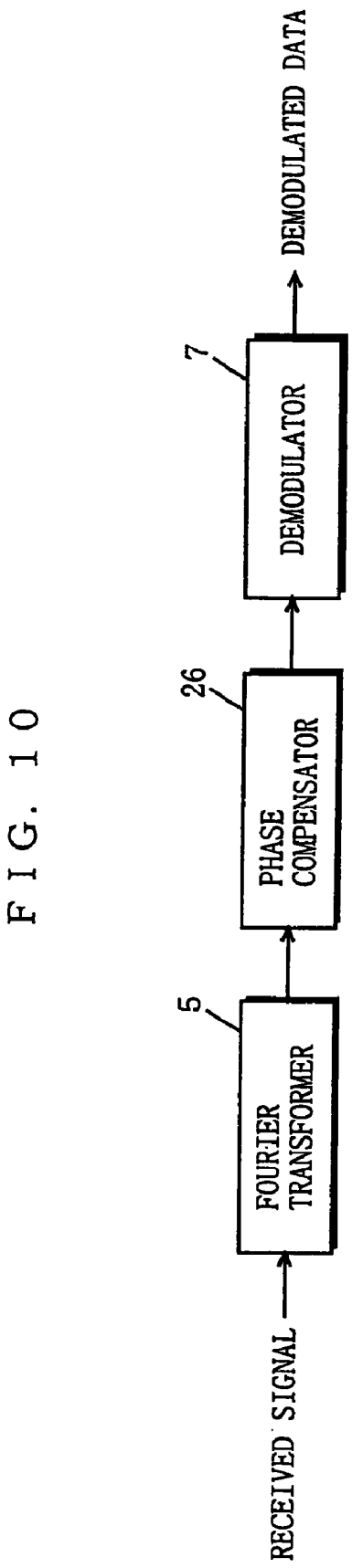
FIG. 10 is a block diagram showing the structure of a receiver according to a second embodiment of the present invention.

FIG. 10 is a schematic view showing the structure of the receiver of the second embodiment. The receiver is provided with the Fourier transformer 5, a phase compensator 26 for compensating for a phase of a signal provided by the Fourier transformer 5, and the demodulator 7 for demodulating a signal outputted from the phase compensator 26. As such, the receiver of the second embodiment includes the phase compensator 26 as an alternative to the TPFR compensator 6 in the receiver in FIG. 4.

The phase compensator 26 frees data provided by the Fourier transformer 5 from frequency drift and residual phase error. The phase compensator 26 is later structurally described in detail. The data freed from error is demodulated by the demodulator 7.

Figure 11:
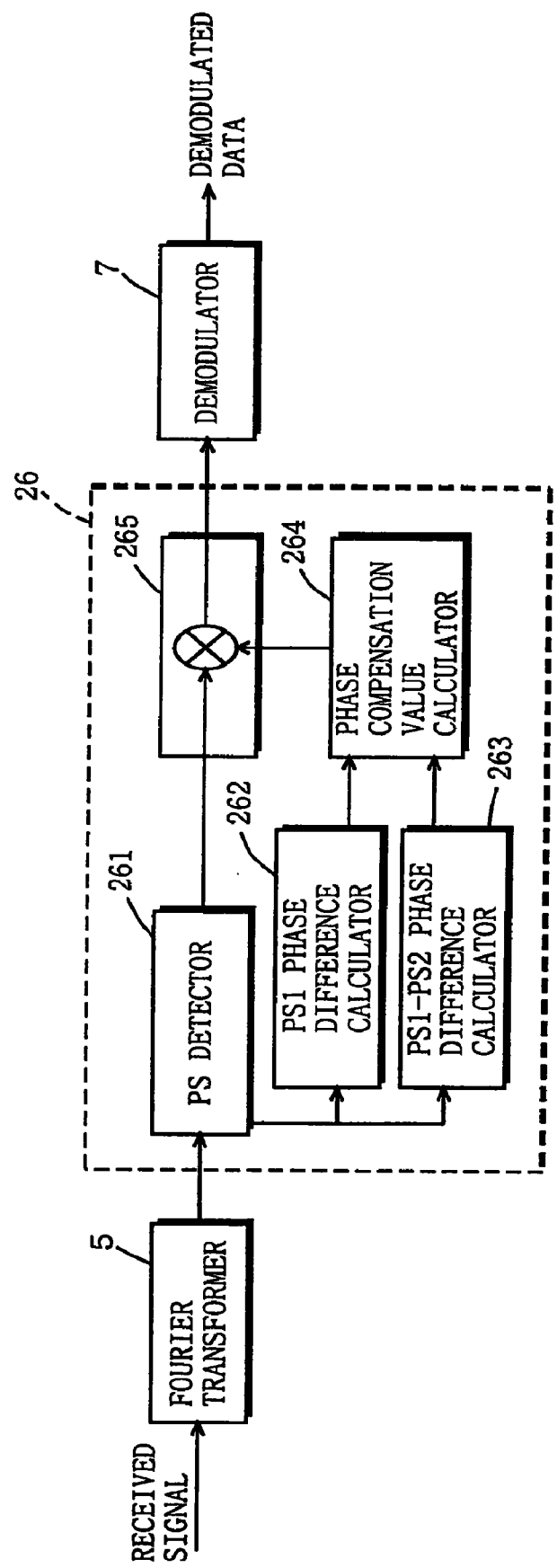
FIG. 11 is a block diagram showing the structure of a phase compensator 26 in the receiver of the second embodiment.

FIG. 11 is a schematic view showing the detailed structure of the phase compensator 26 in the receiver of the second embodiment. The phase compensator 26 includes: a PS detector 261 for detecting a pilot symbol from a signal provided by the Fourier transformer 5; a PS1 phase difference calculator 262 for calculating a difference in phase between the first pilot symbol provided by the PS detector 261 and a predetermined reference pilot symbol; a PS1-PS2 phase difference calculator 263 for calculating a difference in phase between the pilot symbols provided by the PS detector 261; a phase compensation value calculator 264 for calculating a phase compensation value after receiving outputs from the PS1 phase difference calculator 262 and the PS1-PS2 phase difference calculator 263; and a phase rotator 265 for rotating a phase of a signal provided by the PS detector 261 on the basis of an output from the phase compensation value calculator 264. The above description for "PS", "PS1", "PS2" is herein also applicable to the above components.

The PS detector 261 detects, in a similar manner to the PS detector 61 in FIG. 5, a pilot symbol from the Fourier-transformed frequency-domain data. The PS1 phase difference calculator 262 calculates a difference in phase between the subcarriers in the first pilot symbol and those of the reference pilot symbol stored in memory (not shown) in the receiver.

The reference pilot symbol stored in the memory is also an ideal pilot symbol as is the one in the receiver of the first embodiment. Accordingly, by calculating the difference in phase between the subcarriers in the first pilot symbol and those in the reference pilot symbol, a phase error caused by transmission can be obtained.

Figure 12A:
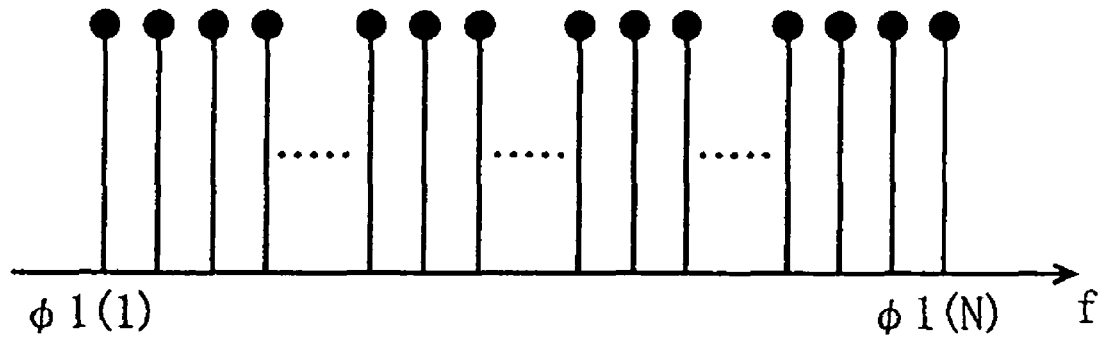
FIGS. 12a and 12b are schematic views each for explaining the subcarriers in the first pilot symbol and those in the reference symbol, respectively.
Figure 12B:
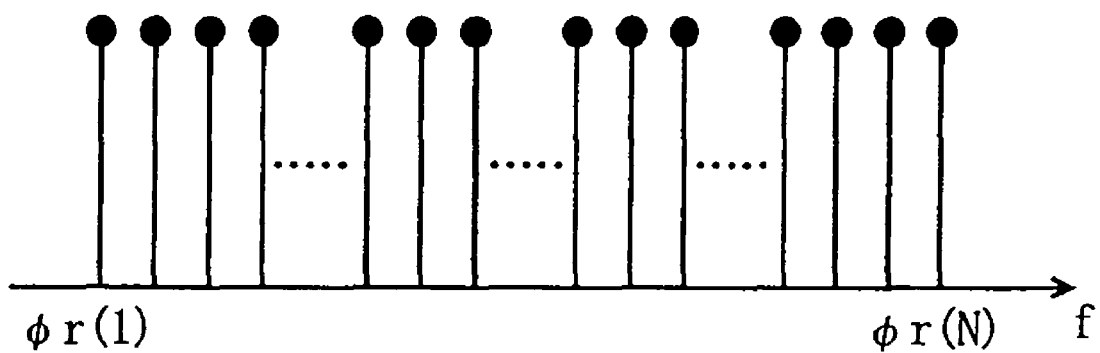

FIGS. 12*a* and 12*b* are schematic views respectively showing the first pilot symbol having the subcarriers with a phase of $\phi 1$ and the reference pilot symbol having those with a phase of $\phi r$. The PS1 phase difference calculator 262 calculates a difference $\phi ps$ between the phase $\phi 1$ as shown in FIG. 12*a* and the phase φr as shown in FIG. 12*b* so as to calculate the phase error of the first pilot symbol. An equation (5) therefor is as follows:

$$\phi ps(i) = \phi 1(i) - \phi r(i) \qquad (5)$$

where i is an arbitrary integer between 1 and N.

The PS1 phase difference calculator 262 averages the phase difference for the number of subcarriers. Assuming that the averaged value is φp, an equation (6) therefor is as follows:

$$\phi p = \frac{1}{N} \sum_{i=1}^{N} \phi ps(i) \qquad (6)$$

The received signal distorts in the transmission path and by noise. Therefore, in order to obtain φp, each carrier in the received pilot symbol is weighed according to its amplitude before calculating the average value. As thereto, it is described how below.

Presumably, a complex signal of the i-th subcarrier in the received first pilot symbol is A1(i), that of the i-th subcarrier in the received second pilot symbol is A2(i), and an amplitude of the i-th subcarrier in the reference pilot symbol is R(i) With such assumption, the average value φp can be calculated by the following equation (7).

$$\phi p = -\text{angle}\left[\sum_{i=1}^{N} \left(\frac{R(i)}{A1(i)}|A1(i)|^2\right)\right] \qquad (7)$$
$$= -\text{angle}\left[\sum_{i=1}^{N} (R(i) \times A1(i)^*)\right]$$

where an asterisk * indicates complex conjugate, and a term "angle" indicates a phase angle of a complex number.

With such equation of calculating the average value, each component is weighed by the power level of the complex signal A1(i). Consequently, any carrier larger in amplitude may contribute more with respect to the average value, and vice versa. In such manner, even if the received signal distorts in the transmission path and by noise, the average value can be calculated with higher accuracy.

The PS1-PS2 phase difference calculator 263 then calculates a difference in phase between the subcarriers in the first pilot symbol and those in the second pilot symbol.

FIGS. 13*a* and 13*b* are schematic diagrams respectively showing the first pilot symbol having the subcarriers with the phase of φ1 and the second pilot symbol having the subcarriers with a phase of φ2. The PS1-PS2 phase difference calculator 263 calculates a phase difference φ between the phase φ1 as shown in FIG. 13*a* and the phase φ2 as shown in FIG. 13*b*. An equation (8) therefor is as follows:

$$\phi(i) = \phi 1(i) - \phi 2(i) \qquad (8)$$

where i is an arbitrary integer between 1 and N.

The PS1-PS2 phase difference calculator 263 averages the phase difference for the number of subcarriers. Assuming that the averaged value is φa, an equation (9) therefor is as follows:

$$\phi a = \frac{1}{N} \sum_{i=1}^{N} \phi(i) \qquad (9)$$

In the above-described manner, the phase error can be correctly calculated for the entire frequency covering every subcarrier by averaging the phase error for the number of subcarriers in the pilot symbol. Therefore, in the OFDM transmission scheme of the second embodiment, the phase error can be calculated with higher accuracy compared with the conventional scheme for interposing the pilot carriers between the data carriers. Since the pilot carriers for insertion in the conventional scheme are quite fewer in number than the subcarriers, it is rather difficult for the conventional scheme to correctly calculate the phase error for the entire frequency band.

In order to calculate such average value more accurately, in a similar manner to the above, each carrier in the received pilot symbol is weighed according to its amplitude before calculating the average value. As thereto, assuming also that the average value is φa, an equation (10) therefor is as follows:

$$\phi a = \text{angle}\left[\sum_{i=1}^{N} \left(\frac{A2(i)}{A1(i)}|A1(i)|^2\right)\right] \qquad (10)$$
$$= \text{angle}\left[\sum_{i=1}^{N} (A2(i) \times A1(i)^*)\right]$$

With such equation of calculating the average value, each component is weighed by the power level of the complex signal A1(i) Consequently, any carrier larger in amplitude may contribute more with respect to the average value, and vice versa. In such manner, even if the received signal distorts in the transmission path and by noise, the average value can be calculated with higher accuracy.

In such manner, however, unlike the receiver of the first embodiment, the compensation value cannot be calculated for each of the subcarriers. From a different point of view, on the other hand, accuracy of compensation may be degraded by calculating the compensation value for each of the subcarriers in such a case that some of the subcarriers in the pilot symbol are suppressed or vanished. By taking this into consideration, the receiver of the second embodiment works effective especially for frequency drift and phase shift distorting every carrier to almost the same extent. More specifically, the receiver of the second embodiment is suitable for communications carried out in a static transmission path with a smaller distortion. Conversely, the receiver of the first embodiment is suitable for mobile communications where distortion level of the transmission path varies or out-of-synchronization is observed with time.

The phase compensation value calculator 264 calculates a phase compensation value φd for each of the data symbols between the first and second pilot symbols. This is done through linear approximation by the phase difference φa between the pilot symbols. The linear approximation is applicable herein since the phase shift caused by the frequency drift becomes linear with time. Therefore, by utilizing linear approximation, compensation can be linearly done with accuracy.

Figure 14:
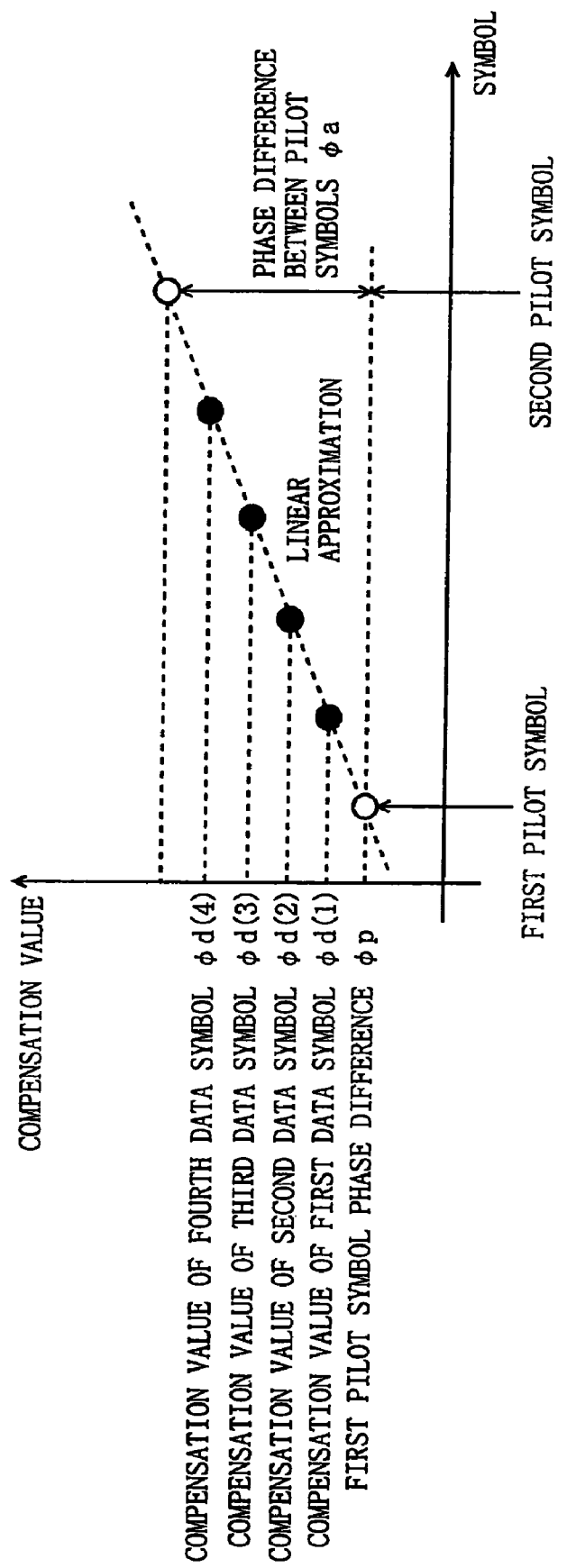
FIG. 14 is a diagram showing that a phase compensating value can be calculated, through linear approximation, from a phase difference between pilot symbols.

FIG. 14 is a graph having a longitudinal axis indicating the phase compensation value φd for each of the data symbols between the first and the second pilot symbols and a lateral axis indicating the symbols by number, i.e., time, and the graph shows the relationship therebetween. As is known from FIG. 14, the phase compensation value φd for each of the data symbols can be calculated, through linear approximation, from the phase compensation value φd between the pilot symbols.

It is now assumed that the number of data symbols between the first and second pilot symbols is M, and a certain data symbol therebetween is k, where k is an arbitrary integer between 1 and M. With such assumption and by using an equation (11) next below, the phase compensation value φd is calculated for each of the data symbols through linear approximation.

$$\phi d(k) = \phi p + \frac{\phi a}{M+1} \times k \tag{11}$$

Figure 15:
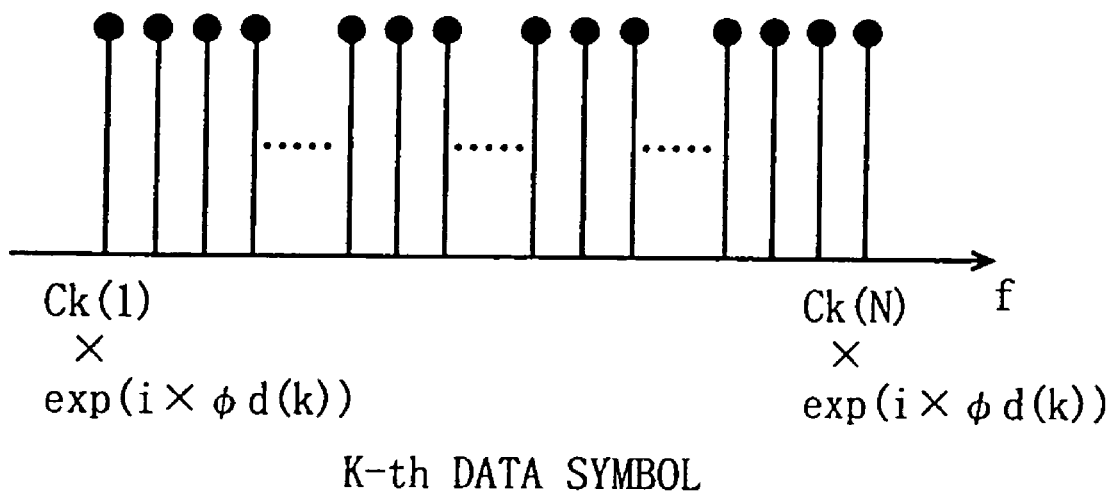
FIG. 15 is a schematic view for explaining how phase compensation is carried out with respect to the subcarriers in the data symbol.

With the phase compensation values calculated in such manner, the phase rotator 265 then compensates the phase of the subcarriers in each of the data symbols between the first and second pilot symbols. FIG. 15 is a schematic view showing how the k-th data symbol is compensated in phase. The subcarriers in each of the data symbols are compensated in phase by utilizing the calculated phase compensation value. An equation (12) therefor is as follows:

$$C'k(i)=Ck(i)\times\exp(j\cdot\phi d(k)) \tag{12}$$

where i and k are, respectively, an arbitrary integer between 1 and N.

Such phase compensation is done with respect to the M data symbols between the first and second pilot symbols. Therefore, as in the receiver of the first embodiment, such data symbols are practically once stored in a data symbol storage (not shown). After the phase compensation values are calculated, the data symbols stored in the data symbol storage are read, and then phase compensation is carried out with respect thereto. By taking this into consideration, like the receiver of the first embodiment, the receiver of the second embodiment is more suitable for image transmission in which an image is not required so soon to be retransmitted or under a broadcast transmission system.

As such, the phase compensator 26 frees the received data from frequency drift and residual phase error. The data symbols can be correctly demodulated even in the multipath fading environment or the high-level-noise environment by compensating, through linear approximation, for the phase error of the data symbols between the pilot symbols. Further, the phase shift caused by the frequency drift is linear with time, allowing linear compensation with accuracy. Therefore, the receiver and reception method of the second embodiment are effective especially for linear phase error such as frequency drift.

As shown in the above equation (12), in the receiver of the second embodiment, every subcarrier included in one data symbol is subjected to phase compensation with a single phase compensation value. Therefore, compared with the TPFR compensator 6 in the receiver of the first embodiment in which the frequency response variation is compensated for by using compensation values calculated for each subcarrier, the phase compensator 26 of this receiver is simplified in structure.

To be more specific, the frequency response compensator 65 in the TPFR compensator 6 is internally provided with memory for storing the compensation values for each of the subcarriers, and performing control and calculation with respect to each of the subcarriers by using the compensation values therefor. On the other hand, the phase rotator 265 in the phase compensator 26 is provided with memory for storing only one compensating value, and performing control and calculation therewith, rendering the structure thereof more simplified.

While the invention has been described in detail, the foregoing description is in all aspects illustrative and not restrictive. It is understood that numerous other modifications and variations can be devised without departing from the scope of the invention.

What is claimed is:

1. A method for transmitting an OFDM signal from a transmission side to a reception side, wherein
   the OFDM signal comprises at least one data symbol including a plurality of subcarriers having data therein, and at least one pilot symbol including a plurality of subcarriers, at least one of the subcarriers having a frequency component predetermined in amplitude and phase, said method comprising:
   inserting, on the transmission side, the pilot symbol before or after one or more data symbols, and transmitting the pilot symbol together with one or more data symbols; and
   utilizing, on the reception side, the received pilot symbol for compensating for a frequency response variation of a transmission path resulted from at least one of distortion in the transmission path, out-of-synchronization with passage of time, frequency drift, and residual phase error, wherein
   the frequency response variation of the transmission path is compensated for by using a compensation vector calculated, as a time series linear approximation, from a difference in frequency response between at least any two pilot symbols closest to each other.

2. The OFDM signal transmission method according to claim 1, wherein every subcarrier included in the pilot symbol is a pilot carrier predetermined in amplitude and phase.

3. The OFDM signal transmission method according to claim 1, wherein said inserting comprises sequentially inserting the pilot symbol and at least one additional pilot symbol before or after one or more data symbols.

4. The OFDM signal transmission method according to claim 1, wherein said inserting comprises periodically inserting a pilot symbol before or after one or more data symbols.

5. The OFDM signal transmission method according to claim 1, wherein said inserting comprises non-periodically inserting a pilot symbol before or after one or more data symbols.

6. The OFDM signal transmission method according to claim 1, further comprising adaptively changing, on the transmission side, a pilot symbol in frequency and number for insertion depending on a state of the transmission path.

7. The OFDM signal transmission method according to claim 1, further comprising providing, on the transmission side, the OFDM signal with control information indicating how often and how many pilot symbols are inserted.

8. The OFDM signal transmission method according to claim 1, wherein the frequency response variation of the transmission path is compensated for by using an average value taken for a phase error among pilot carriers in the pilot symbol.

9. The OFDM signal transmission method according to claim 8, wherein the average value is calculated by weighing each amplitude value for the pilot carriers.

10. An OFDM signal transmitter for transmitting an OFDM signal towards a reception side, said OFDM signal transmitter comprising:
- a data symbol generator for generating an OFDM data symbol including a plurality of subcarriers for data for transmission;
- a pilot symbol generator for generating an OFDM pilot symbol including a plurality of subcarriers; and
- a symbol selector for switching between signals provided by said data symbol generator and said pilot symbol generator so that the pilot symbol is inserted before or after one or more data symbols, wherein
- the OFDM signal comprises at least one data symbol including a plurality of subcarriers having data therein, and at least one pilot symbol including a plurality of subcarriers, at least one of the subcarriers having a frequency component predetermined in amplitude and phase,
- on the reception side, the pilot symbol is received and utilized for compensating for a frequency response variation of a transmission path resulted from at least one of distortion in the transmission path, out-of-synchronization with passage of time, frequency drift, and residual phase error, and
- the frequency response variation of the transmission path is compensated for by using a compensation vector calculated, as a time series linear approximation, from a difference in frequency response between at least any two pilot symbols closest to each other.

11. The OFDM signal transmitter according to claim 10, wherein
said data symbol generator comprises:
- a frequency-domain data symbol generator for generating a frequency-domain data symbol after inputting the data for transmission; and
- an inverse Fourier transformer for subjecting a signal provided by said frequency-domain data symbol generator to inverse Fourier transform, and said pilot symbol generator comprises:
- a frequency-domain pilot symbol generator for generating a frequency-domain pilot symbol; and
- an inverse Fourier transformer for subjecting a signal provided by said frequency-domain pilot symbol generator to inverse Fourier transform.

12. The OFDM signal transmitter according to claim 10, wherein
said data symbol generator comprises:
- a frequency-domain data symbol generator for generating a frequency-domain data symbol after inputting the data for transmission; and
- a time-domain data symbol converter for converting the frequency-domain data symbol into a time-domain data symbol, and said pilot symbol generator comprises:
- a frequency-domain pilot symbol generator for generating a frequency-domain pilot symbol; and
- a time-domain pilot symbol converter for converting the frequency-domain pilot symbol into a time-domain pilot symbol.

13. A method for transmitting an OFDM signal, the method comprising:
- generating the OFDM signal; and
- transmitting the OFDM signal, wherein
the OFDM signal comprises:
- at least one data symbol including a plurality of subcarriers having data therein; and
- at least one pilot symbol having a plurality of subcarriers having a frequency component predetermined in amplitude and phase,
one or more pilot symbols are located before or after one or more data symbols in a time-domain,
on a reception side, the pilot symbol is received and utilized for compensating for a frequency response variation of a transmission path resulted from at least one of distortion in the transmission path, out-of-synchronization with passage of time, frequency drift, and residual phase error, and
the frequency response variation of the transmission path is compensated for by using a compensation vector calculated, as a time series linear approximation, from a difference in frequency response between at least any two pilot symbols closest to each other.

* * * * *